United States Patent [19]
Seok

[11] Patent Number: 6,084,377
[45] Date of Patent: Jul. 4, 2000

[54] VOLTAGE VECTOR OVERMODULATION TECHNIQUE CONSIDERING COUNTER ELECTROMOTIVE FORCE OF MOTOR

[75] Inventor: Jul-ki Seok, Suwon, Rep. of Korea

[73] Assignee: SamSung Electronics Co., Ltd., Suwon, Rep. of Korea

[21] Appl. No.: 09/342,831

[22] Filed: Jun. 28, 1999

[30] Foreign Application Priority Data

Jul. 1, 1998 [KR] Rep. of Korea ............... 98-26468

[51] Int. Cl.[7] ........................................... H02P 5/28
[52] U.S. Cl. .................... 318/798; 318/368; 388/928.1
[58] Field of Search ................... 318/500, 368, 318/377, 727, 798; 388/928.1

[56] References Cited

U.S. PATENT DOCUMENTS

| | | | |
|---|---|---|---|
| 4,958,117 | 9/1990 | Kerkman et al. | 318/805 |
| 5,032,771 | 7/1991 | Kerkman et al. | 318/52 |
| 5,038,092 | 8/1991 | Asano et al. | 318/811 |
| 5,329,217 | 7/1994 | Kerkman et al. | 318/811 |
| 5,614,803 | 3/1997 | Morioka et al. | 318/801 |
| 5,717,305 | 2/1998 | Seibel et al. | 318/778 |
| 5,903,128 | 3/1999 | Sakakibara et al. | 318/721 |
| 5,923,144 | 7/1999 | Seibel et al. | 318/805 |
| 5,949,210 | 9/1999 | Gataric et al. | 318/609 |
| 6,008,616 | 12/1999 | Magayama et al. | 318/773 |

*Primary Examiner*—Robert E. Nappi
*Assistant Examiner*—Rita Leykin
*Attorney, Agent, or Firm*—Robert E. Bushnell, Esq.

[57] ABSTRACT

A voltage vector overmodulation technique considering a counter electromotive force of a motor with respect to a voltage applied to the motor in a transient state during the operation of the motor, selects a voltage having the least logarithmic difference between a counter electromotive force according to the voltage applied to the motor and a command voltage as an application control voltage of the motor. Thus, since a response voltage to correspond to a transient state during the operation of the motor is selected considering the dynamic characteristic of the motor, a voltage most appropriate for the operation of the motor can be selected. Also, the current controller and the speed controller of the motor can stably be operated and maximum use of the available torque of the motor is possible.

4 Claims, 5 Drawing Sheets

VOLTAGE VECTOR OVERMODULATION TECHNIQUE CONSIDERING COUNTER ELECTROMOTIVE FORCE OF MOTOR

CLAIM OF PRIORITY

This application makes reference to, incorporates the same herein, and claims all benefits accruing under 35 U.S.C. §119 from my application VOLTAGE VECTOR OVERMODULATION METHOD CONSIDERING COUNTER ELECTROMOTIVE FORCE OF MOTOR filed with the Korean Industrial Property Office on Jul. 1, 1998 and there duly assigned Serial No. 26468/1998.

BACKGROUND OF THE INVENTION

1. Field of the Invention

The present invention relates to a vector overmodulation technique with respect to the voltage applied to a motor, and more particularly, to a voltage vector overmodulation technique considering a counter electromotive force of a motor.

2. Description of the Related Art

Microprocessors and logic circuits have become highly integrated and exhibit high performance. With the above developments in the semiconductor technologies, the operational performance and control algorithm used in a power converting apparatus such as an inverter are being developed more intensively. Particularly, as the current control and PWM (pulse width modulation), which are core control technologies for the power converting apparatus, become digitized with their performance increasing, various methods of PWM are currently employed in the industrial field. Of the PWM methods, a spatial vector PWM method in which the rate of voltage use is high and higher harmonics exists less is actively adopted.

An earlier voltage vector overmodulation technique uses a simple algorithm so that vector overmodulation is easily realized and less calculation is required. However, in the earlier voltage vector overmodulation method, the voltage selected by the overmodulation is generated without consideration of the dynamic characteristics of the motor. That is, although the voltage of the motor is constituted by components of a counter electromotive force and a voltage drop due to inductance and resistance, since the earlier technique selects the voltage at the boundary between the command voltage and the side of a hexagon, the counter electromotive force and voltage drop components are not taken into consideration so that an error occurs. Accordingly, a voltage having an error in the transient state is applied to the motor so that the control performance of a motor control system is lowered.

SUMMARY OF THE INVENTION

To solve the above problem, it is an objective of the present invention to provide a voltage vector overmodulation technique considering a counter electromotive force of a motor by which a rapid speed and a torque response characteristic are possible in a transient state due to overmodulation.

Accordingly, to achieve the above object, there is provided a voltage vector overmodulation technique considering a counter electromotive force of a motor with respect to a voltage applied to the motor in a transient state during the operation of the motor, in which a voltage having the least logarithmic difference between a counter electromotive force according to the voltage applied to the motor and a command voltage is selected as an application control voltage of the motor.

Thus, according to the present invention, since a response voltage to correspond to a transient state during the operation of the motor is selected considering the dynamic characteristic of the motor unlike the earlier technique, a voltage most appropriate for the operation of the motor can be selected. Also, the current controller and the speed controller of the motor can stably be operated and maximum use of the available torque of the motor is possible.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
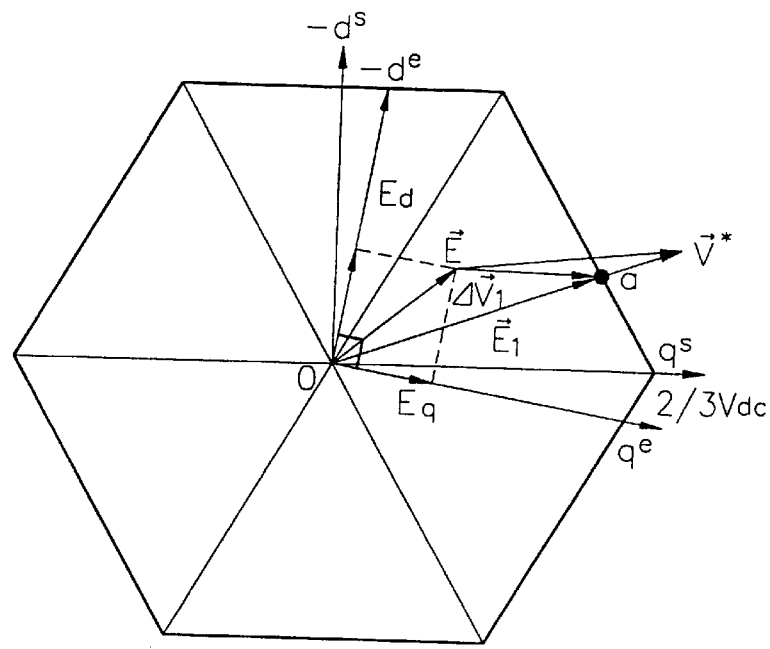
FIG. 1 is a voltage vector diagram for explaining an earlier voltage vector overmodulation technique.
Figure 2:
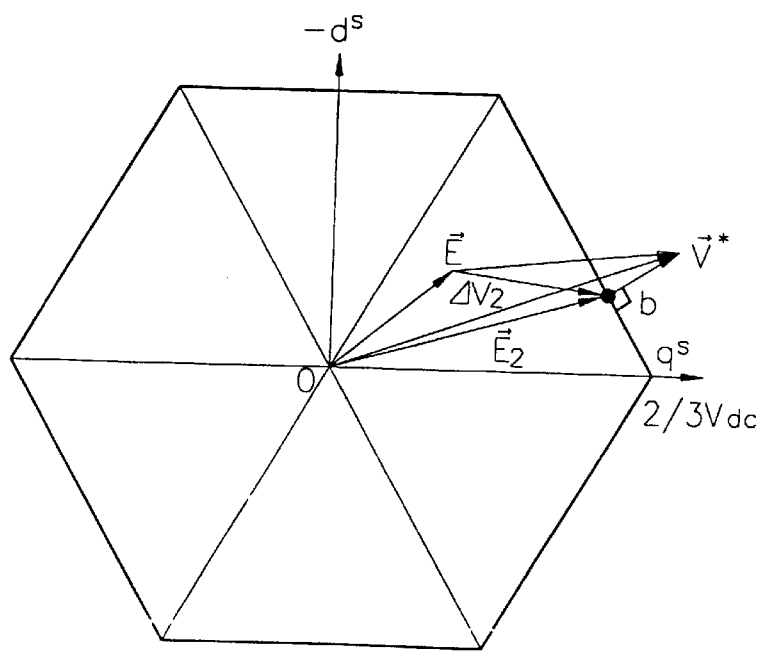
FIG. 2 is a voltage vector diagram for explaining another earlier voltage vector overmodulation technique.

FIGS. 1 and 2 are voltage vector diagrams for explaining an earlier voltage vector overmodulation method.

As shown in FIG. 1, to cope with a transient state of a motor operation, the earlier vector overmodulation technique selects a voltage $\vec{E}_1$ having the same direction as a command voltage $\vec{V}*$ and a magnitude corresponding to the distance from the origin "0" to a point "a" on a side of a hexagon, as a voltage responding to the transient state. Alternatively, as shown in FIG. 2, the earlier vector overmodulation method selects a voltage $\vec{E}_2$ having a magnitude corresponding to the distance from the origin "0" to a point "b" perpendicular to a side of a hexagon at the leading edge of the command voltage $\vec{V}*$, as a voltage responding to the transient state. These voltages $\vec{E}_1$ and $\vec{E}_2$ have magnitudes and directions corresponding to the errors of $\Delta\vec{V}_1$ and $\Delta\vec{V}_2$ compared to $\vec{V}*$ and $\vec{E}$ the difference between the commend voltage $\vec{V}*$ and a counter electromotive force component $\vec{E}$ The cases of FIGS. 1 and 2 can be expressed by Equations 1 and 2.

$$T_1 = \frac{T_S}{T_1' + T_2'} T_1' \qquad \text{[Equation 1]}$$

$$T_2 = \frac{T_S}{T_1' + T_2'} T_2'$$

$$T_1 = T_1' - \frac{T_1' + T_2' - T_S}{2} \quad \text{[Equation 2]}$$

$$T_2 = T_2' - \frac{T_1' + T_2' - T_S}{2}$$

$T_1$ and $T_2$ are the time needed for generation of voltages $\vec{E}_1$ and $\vec{E}_2$ selected in response to the overmodulation; $T_1'$ and $T_2'$ are the time needed for the generation of the command voltage $\vec{V}^*$; and $T_s$ is the sampling time.

Figure 3:
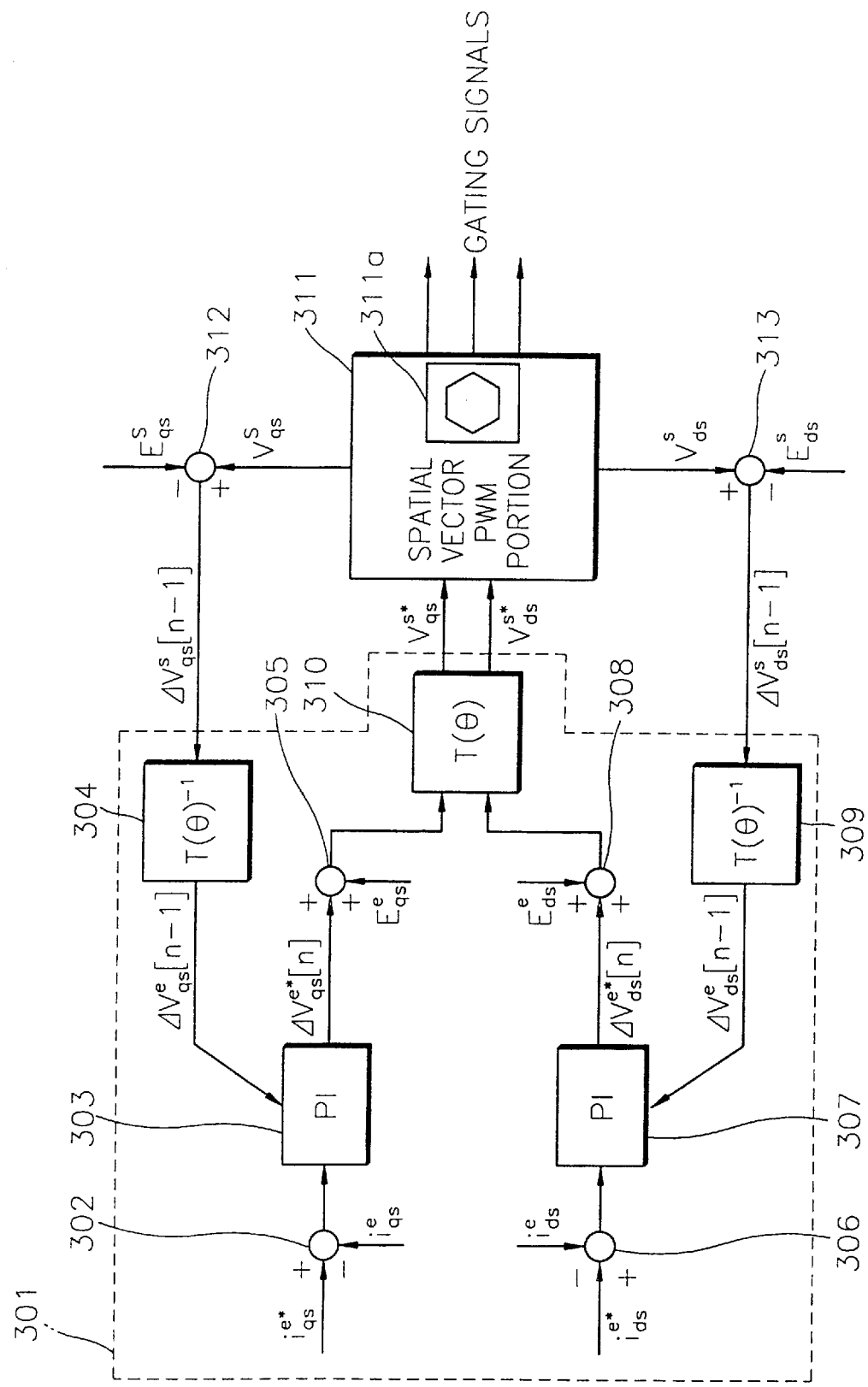
FIG. 3 is a block diagram showing the structure of a motor control system adopting a voltage vector overmodulation technique considering a counter electromotive force of a motor according to the present invention.

Referring to FIG. 3, a motor control system adopting the voltage vector overmodulation technique considering a counter electromotive force of the motor according to the present invention is comprised of a current controller 301 for controlling current applied to the motor and a modulation portion 311 for modulating the voltage applied to the motor and for outputting the modulated voltage.

The current controller 301 is comprised of proportional and integral controllers (PI's) 303 and 307 and conversion matrices 304, 309, and 310 for converting a three-phase synchronous axis to a two-phase synchronous axis (axes d and q). The modulation portion 311 modulates an input voltage by a spatial vector pulse width modulation and outputs a gating signal for driving a gate (not shown) of a transistor of a switching portion. A limiter 311a which uses an algorithm to limit a selection (or setting) range of the voltage vector due to the overmodulation is provided in the modulation portion 311. In FIG. 3, reference numerals 302, 306, 312, and 313 indicate subtracters and reference numerals 305 and 308 indicate adders.

According to the present invention in connection with a motor control system having the above structure, the voltage vector overmodulation method considering a counter electromotive force of a motor achieves overmodulation using information on the counter electromotive force in the motor. That is, in performing vector overmodulation with respect to the voltage applied to the motor in a transient state during the operation of the motor, the voltage having the least logarithmic difference between the counter electromotive force component according to the voltage applied to the motor and the command voltage is selected as an application control voltage of the motor. The above procedure will be described in detail with reference to FIGS. 4 through 7.

Figure 4:
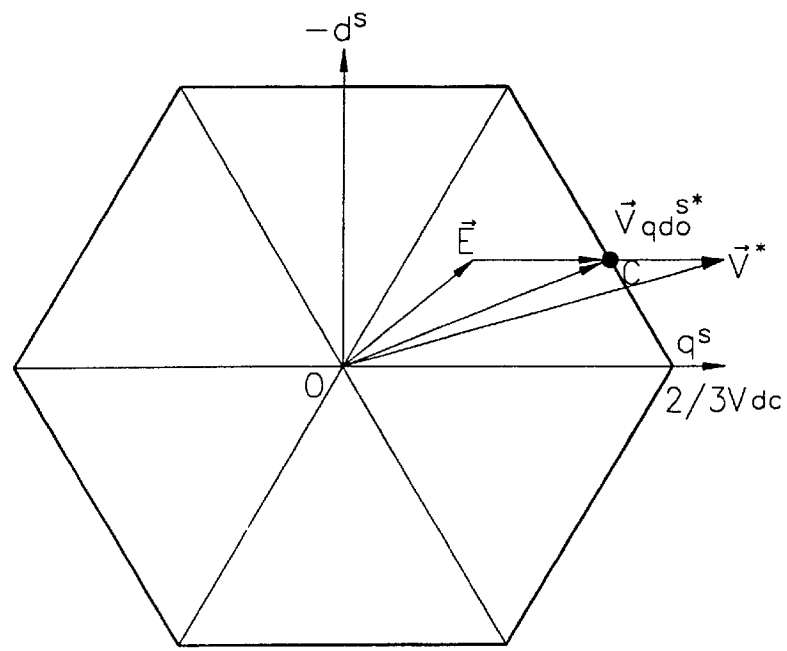
FIGS. 4 through 7 are voltage vector diagrams for explaining the voltage vector overmodulation technique considering the counter electromotive force of a motor according to the present invention.

Referring to FIG. 4, according to the voltage vector overmodulation method of the present invention, a voltage having the least logarithmic difference between the counter electromotive force component $\vec{E}$ according to the voltage applied to the motor and the command voltage $\vec{V}^*$, i.e., a voltage $\vec{V}_{qdo}^{s*}$ having a magnitude corresponding to the distance from the origin "0" to a point "c" on a side of a hexagon is selected as the voltage responding to the transient state. Here, an actual realization method of determining the voltage $\vec{V}_{qdo}^{s*}$ having a magnitude corresponding to the distance from the origin "0" to the point "c" on a side of a hexagon is shown in FIGS. 5 and 6.

Figure 5:
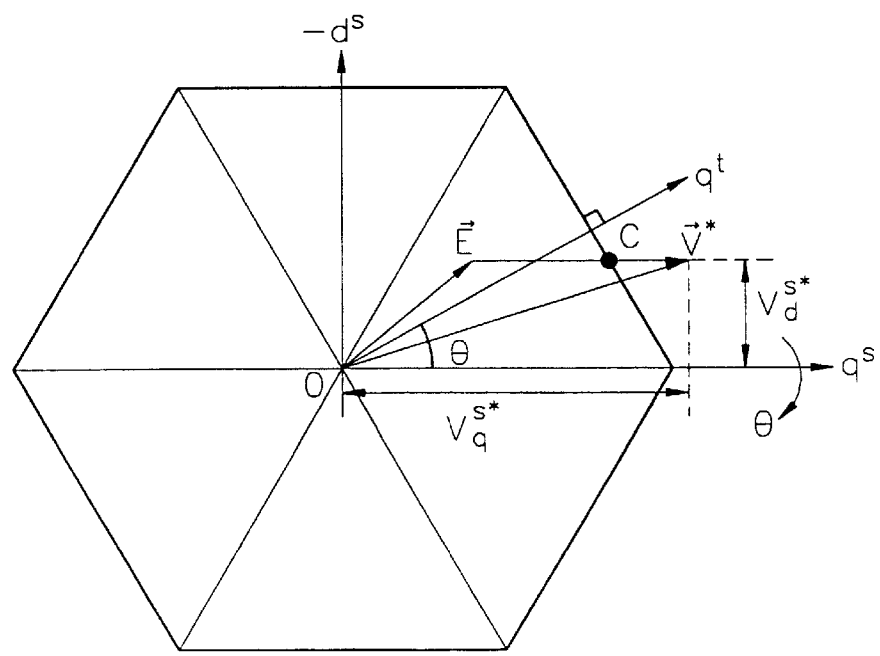
Figure 6:
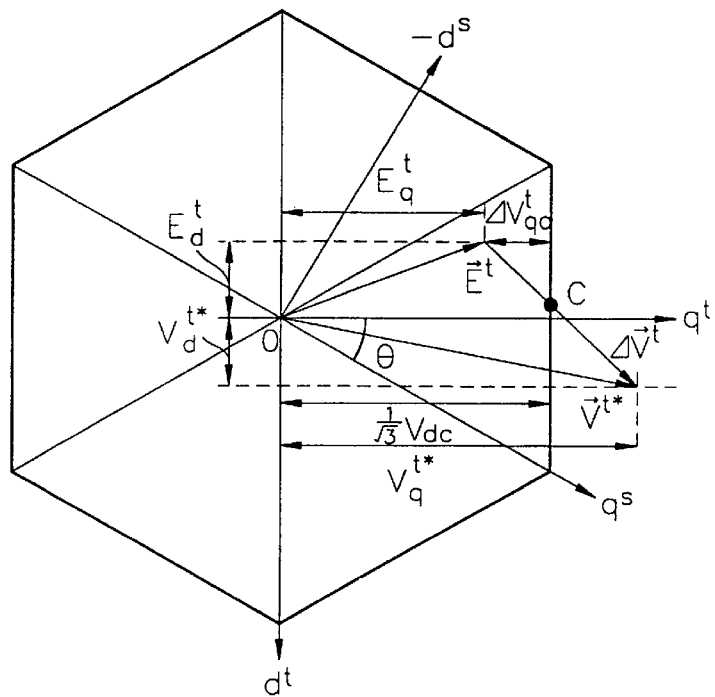

Referring to FIG. 5, the command voltage $\vec{V}^*$ consisting of the counter electromotive force component $\vec{E}$ and the voltage corresponding to a current error is divided into two voltage components of $\vec{V}_d^{s*}$ and $\vec{V}_q^{s*}$ on the plane $d^s$-$q^s$. Here, to obtain the position of the point "c" where the command voltage $\vec{V}^*$ of an overmodulation area and the boundary of a side of a hexagon, coordinate axes are rotated by an angle θ from the state of FIG. 5 as shown in FIG. 6. Accordingly, a new reference coordinate axis is $d^t$-$q^t$ and the command voltage $\vec{V}^*$ and the counter electromotive force component $\vec{E}$ can be presented by a component on the plane $d^t$-$q_t$, the relationship of which is expressed by Equation 3.

$$\begin{vmatrix} V_q^{t*} \\ V_d^{t*} \end{vmatrix} = T(\theta) \begin{vmatrix} V_q^{s*} \\ V_d^{s*} \end{vmatrix} \quad \text{[Equation 3]}$$

Here, T(θ) indicates a conversion matrix which corresponds to reference numeral 310 of FIG. 3 and has a relationship of θ=30°+60°(m−1), wherein m indicates the sector number. (There are six sequentially numbered sectors from 1 to 6 corresponding to the areas defined when the hexagon is divided into six triangles.)

Also, $\Delta V_{qo}^t$ is obtained from FIG. 6 as follows.

$$\Delta V_{qo}^t = \frac{1}{\sqrt{3}} V_{dc} - E_q^t \quad \text{[Equation 4]}$$

Figure 7:
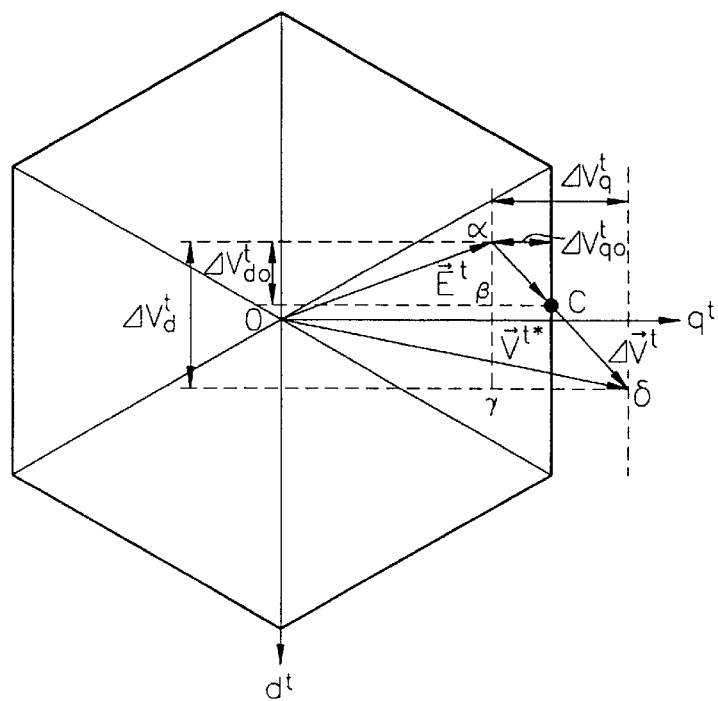

Thus, from the above, the vector $\vec{V}_{qdo}^{s*}$ corrected on the plane $d^s$-$q^s$ can be obtained by Equation 5 referring to the voltage vector diagram of FIG. 7.

$$V_{qdo}^{s*} = T^{-1}(\theta) \begin{vmatrix} E_q^t + V\Delta_{qo}^t \\ E_d^t - V\Delta_{do}^t \end{vmatrix} \quad \text{[Equation 5]}$$

Here, $T^{-1}(\theta)$ indicates an inversion matrix which corresponds to reference numerals 304 and 309 of FIG. 3.

Figure 8:
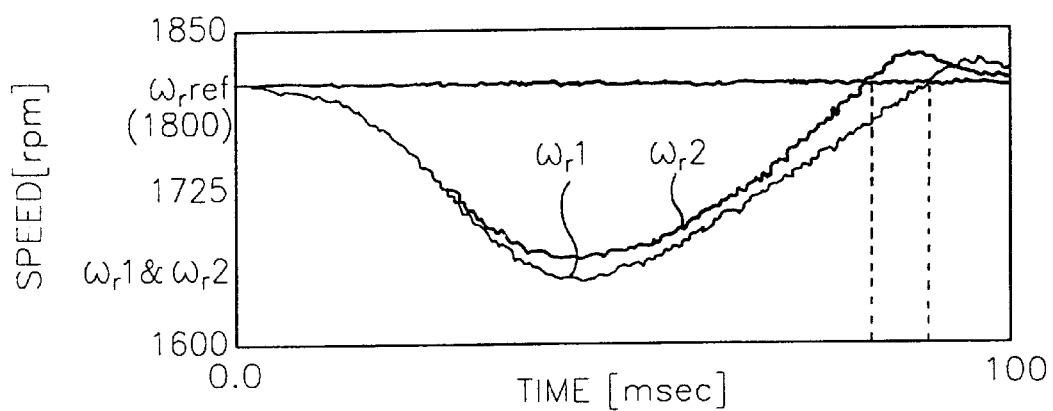
FIG. 8 is a waveform showing the speed response characteristics of motor control systems adopting the earlier voltage vector overmodulation technique and the voltage vector overmodulation technique according to the present invention, respectively.

FIG. 8 is a waveform showing a speed response characteristic in motor control systems respectively adopting the earlier voltage vector overmodulation method and the voltage vector overmodulation method according to the present invention.

In FIG. 8, when a step load is applied at 1800 r.p.m., it can be seen that the speed response characteristic $\omega_r 2$ in the case according to the present invention is much superior to the speed response characteristic $\omega_r 1$ in the case according to the earlier technology.

As described above, in the voltage vector overmodulation method considering a counter electromotive force of a motor according to the present invention, since a response voltage corresponding to a transient state during the operation of the motor is selected considering the dynamic characteristic of the motor unlike the earlier technology, a voltage most appropriate for the operation of the motor can be selected. Thus, the current controller and the speed controller of the motor can stably be operated and maximum use of the available torque of the motor is possible.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A motor control system adopting the voltage vector overmodulation technique considering a counter electromotive force of the motor, the system comprising:

a current controller connected to a modulation uni, said current controller having first, second, third, and fourth inputs and first and second outputs and said modulation unit having first and second inputs and first and second outputs, said first and second outputs of said current controller being respectively connected to said first and second inputs of said modulation unit; and first and second subtractors each having first and second inputs and an output, said first output of said modulation unit being connected to said first input of said first subtractor and said second output of said modulation unit being connected to said first input of said second subtractor.

2. The system of claim 1, said current controller comprising:

third and fourth subtractors, each having first and second inputs and an output, said first input of said third subtractor being connected to said first input of said current controller and said first input of said fourth subtractor being connected to said second input of said current controller;

first and second proportional and integral controllers each having first and second inputs and an output, said output of said third subtractor being connected to said first input of said first proportional and integral controller and said output of said fourth subtractor being connected to said first input of said second proportional and integral controller;

first and second adders each having first and second inputs and an output, said output of said first proportional and integral controller being connected to said first input of said first adder and said output of said second proportional and integral controller being connected to said first input of said second adder;

a first conversion matrix unit having first and second inputs and first and second outputs, said first and second inputs of said first conversion matrix unit being respectively connected to said outputs of said first and second adders and said first and second outputs of said first conversion matrix unit being respectively connected to said first and second outputs of said current controller; and second and third conversion matrix units each having an input and an output, said input of said second conversion matrix unit being connected to said third input of said current controller which is in turn connected to an output of said first subtractor and an output of said second conversion matrix unit being connected to said second input of said first proportional and integral controller, said input of said third conversion matrix unit being connected to said fourth input of said current controller which is in turn connected to an output of said second subtractor and an output of said third conversion matrix unit being connected to said second input of said second proportional and integral controller.

3. A voltage vector overmodulation method considering a counter electromotive force of a motor with respect to a voltage applied to said motor in a transient state during the operation of said motor, comprising selecting a voltage having the least logarithmic difference between a counter electromotive force according to the voltage applied to said motor and a command voltage as an application control voltage of said motor;

wherein, in a voltage vector diagram using a hexagon, a voltage having the least logarithmic difference between said counter electromotive force component $\vec{E}$ and said command voltage $\vec{V}^*$ comprises a voltage $\vec{V}_{qdo}^{s*}$ having a magnitude corresponding to a distance from an origin "0" to a point "c" where a voltage vector beginning from a leading edge of said counter electromotive force component $\vec{E}$ and extending to said command voltage $\vec{V}^*$ meets on a side of said hexagon.

4. The method as claimed in claim 3, wherein, to obtain the position of said point "c", coordinate axes are rotated by an angle θ from an original plane $d^s$-$q^s$ to set a new reference coordinates axes and, on a plane $d^r$-$q^r$ of said new reference coordinates axes, a counter electromotive force component $\vec{E}^r$ and a command voltage $\vec{V}^{r*}$ corresponding to said counter electromotive force component $\vec{E}$ and said command voltage $\vec{V}^*$, respectively, are obtained.

* * * * *